No. 664,889. Patented Jan. 1, 1901.
K. OGIMURA.
FISHING TACKLE.
(Application filed Sept. 28, 1900.)
(No Model.)
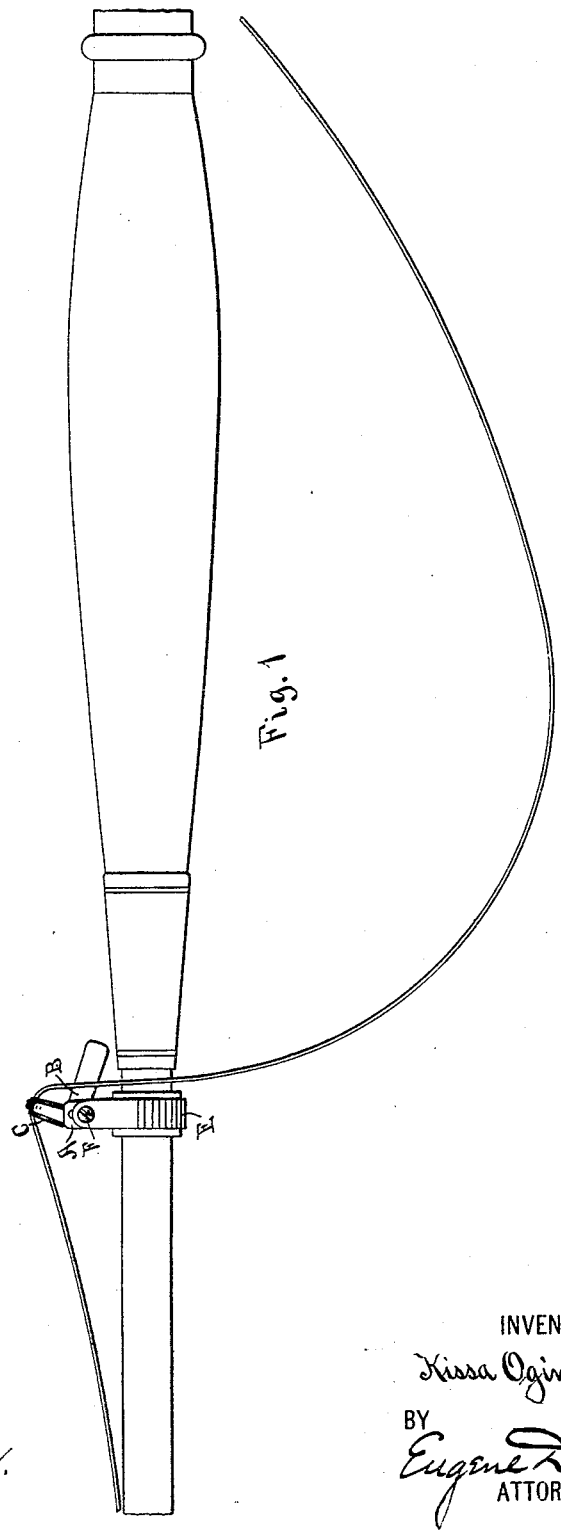
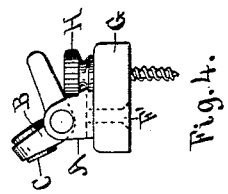
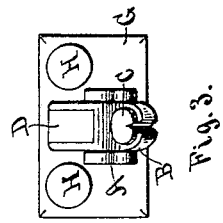
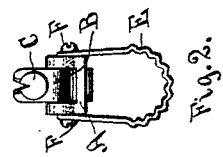
WITNESSES:
Edith L. Miller
M. E. Verbeck
INVENTOR
Kissa Ogimura
BY
Eugene Diven
ATTORNEY

UNITED STATES PATENT OFFICE.

KISSA OGIMURA, OF ELMIRA, NEW YORK.

FISHING-TACKLE.

SPECIFICATION forming part of Letters Patent No. 664,889, dated January 1, 1901.

Application filed September 28, 1900. Serial No. 31,440. (No model.)

*To all whom it may concern:*

Be it known that I, KISSA OGIMURA, a citizen of the United States, residing at Elmira, in the county of Chemung and State of New York, have invented a new and useful Improvement in Fishing-Tackle, of which the following is a specification.

My invention relates to an improved line check and release; and the object of my improvement is to provide means whereby a slack portion of the line is maintained in front of the reel on a fishing-pole or in front of the hand or other point of attachment where a pole is not used, the forward point of this slack portion of the line being held in check by a slight frictional resistance in order that when a fish takes the bait the slack portion of the line may run out, thereby giving the fish time to swallow the bait and hook before the line is brought up taut and at the same time giving the fisherman warning by the running out of the slack, so that he may properly manipulate the reel or the line to hook the fish. I attain this object by means of the device illustrated in the accompanying drawings, in which—

Figure 1 represents a portion of a fishing-pole with my device attached thereto; Fig. 2, a front elevation of the device removed from the pole, and Figs. 3 and 4 plan and side views of the device fastened upon a screw-plate by which it may be attached to a boat or other support.

Similar letters refer to like parts in the several views.

A represents a yoke in which is pivoted an angle-plate B. The upwardly-projecting arm of this angle-plate is provided with an eye to receive a piece of cork or other suitable material C, and the rearwardly-projecting arm furnishes a counterweight to hold the forward arm in vertical position against the pull on the line. If necessary, this rearward arm may have additional weight given it by a lead insert, as indicated at D in Fig. 3. The upper portion of the eye on this angle-plate is cut through, and the upper portion of the cork C is notched to receive and engage the line with a slight frictional grip.

E represents a corrugated strap by means of which the yoke A is secured to a pole, as indicated in Fig. 1, small screws F F at each side of the yoke being provided to secure the strap thereto.

In the modification shown in Figs. 3 and 4 the yoke is secured on the top of a block G by means of screws F', as indicated by broken lines in Fig. 4, and the block G is provided with two thumb-screws H H, by means of which it may be secured to the seat or gunwale of a boat or to any other suitable support.

In operation the line after the hook has been thrown out is pressed into the notch in the cork C and a small slack run out between this point and the reel on the fishing-pole, as indicated in Fig. 1, (the reel not being shown, as its location is beyond the limits of the drawings,) or if the fisherman is trolling or otherwise fishing without a pole the slack will be run out between his hand or other point of attachment and the cork C. When a fish takes the bait, the line will be pulled forward and the angle-plate B will be tilted forward, thereby permitting the line to be pulled out from the notch in the cork C and allowing the fish to run with the bait until it has swallowed the hook. At the same time the fisherman is given notice and has sufficient warning to enable him to properly hook the fish. While the grip of the cork upon the line and the weight of the rearwardly-projecting arm of the angle-plate B will be sufficient to hold the line against running out when the hook is free, they will not hold the line in check sufficiently to prevent it from running out when a fish takes the bait, and the fish will therefore not be frightened away by finding the bait attached to the end of a rigid line and will have time to swallow the bait before the line is brought up taut. Moreover, if the hook is caught upon a snag or other obstacle the line will also be released from the check, thereby giving the fisherman warning of this fact, so that he may release the hook before the line is broken.

While I have specified a cork filler for the eye in the angle-plate B, any suitable material may be used for this purpose which will allow the line to be pressed into the notch and gripped in the proper manner.

Having thus described my device, what I claim as my invention, and desire to secure by Letters Patent, is—

1. A check and release for fish-lines comprising a tilting plate pivoted upon a suitable support and provided with a notch to engage the line whereby a slack in the line is maintained under slight restraint in proximity to the fisherman for the purpose set forth.

2. A check and release for fish-lines comprising an angle-plate pivoted upon a suitable support and having an eye in its upwardly-projecting arm and a cork or other resilient filler in the eye, said eye and filler being notched at the top to receive the line, as and for the purpose set forth.

3. A check and release for fish-lines comprising a pivoted angle-plate having an eye in its upwardly-projecting arm, a cork or other resilient filler in the eye, said eye and filler being notched at the top to receive the line, a yoke in which the angle-plate is pivoted, and means for attaching the yoke to a pole or other place of support.

In testimony whereof I have affixed my signature in presence of two witnesses.

KISSA OGIMURA.

Witnesses:
 M. E. VERBECK,
 EDITH L. MILLER.